United States Patent
Hui et al.

(10) Patent No.: US 8,934,366 B2
(45) Date of Patent: Jan. 13, 2015

(54) DISTRIBUTED NODE MIGRATION BETWEEN ROUTING DOMAINS

(75) Inventors: Jonathan W. Hui, Belmont, CA (US); Wei Hong, Berkeley, CA (US); Jeongyeup Paek, Santa Clara, CA (US); Philip Buonadonna, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 116 days.

(21) Appl. No.: 13/550,146

(22) Filed: Jul. 16, 2012

(65) Prior Publication Data

US 2013/0279365 A1   Oct. 24, 2013

Related U.S. Application Data

(60) Provisional application No. 61/636,117, filed on Apr. 20, 2012.

(51) Int. Cl.
*H04L 12/24*   (2006.01)

(52) U.S. Cl.
CPC ..................................... *H04L 41/12* (2013.01)
USPC ........................................ 370/252; 709/241

(58) Field of Classification Search
CPC .......... H04L 41/00; H04L 41/12; H04L 45/02
USPC .................. 370/229–231, 252, 254, 400; 709/223–225, 238, 239, 241, 242; 455/436–439
See application file for complete search history.

(56) References Cited

U.S. PATENT DOCUMENTS

| | | | |
|---|---|---|---|
| 7,117,273 B1 | 10/2006 | O'Toole et al. | |
| 7,171,491 B1 | 1/2007 | O'Toole et al. | |
| 7,185,077 B1 | 2/2007 | O'Toole et al. | |
| 7,688,795 B2 | 3/2010 | Doshi et al. | |
| 7,765,272 B1 | 7/2010 | McKernan et al. | |
| 7,936,737 B2 | 5/2011 | Doshi et al. | |
| 7,941,502 B2 | 5/2011 | McKernan et al. | |
| 7,984,137 B2 | 7/2011 | O'Toole, Jr. et al. | |
| 8,004,981 B2 | 8/2011 | Bergamasco et al. | |
| 2009/0088131 A1* | 4/2009 | Gholmieh et al. | 455/410 |
| 2010/0332683 A1* | 12/2010 | Das et al. | 709/249 |
| 2012/0155329 A1* | 6/2012 | Shaffer et al. | 370/255 |
| 2012/0230222 A1* | 9/2012 | Shaffer et al. | 370/254 |

OTHER PUBLICATIONS

Gnawali, et al., "The Minimum Rank Objective Function with Hysteresis", IETF Trust, Network Working Group, Internet-Draft, draft-ieft-roll-minrank-hysteresis-of-03, May 2011, 11 pages.

(Continued)

*Primary Examiner* — Kerri Rose
(74) *Attorney, Agent, or Firm* — Parker Ibrahim & Berg LLC; James M. Behmke; Stephen D. LeBarron

(57) ABSTRACT

In one embodiment, a device connected to a network receives at a network interface a first network size indicator for a first network and a second network size indicator for a second network. A difference between the first network size indicator and the second network size indicator is determined and a switching probability is calculated if the difference between the network size indicators is greater than a predetermined network size difference threshold. The device may then migrate from the first network to the second network based on the switching probability.

20 Claims, 11 Drawing Sheets

(56) References Cited

OTHER PUBLICATIONS

Hui, et al., "Distributed Node Migration Between Routing Domains", U.S. Appl. No. 61/636,117, filed Apr. 20, 2012, 32 pages.

Thubert; et al., "RPL Objective Function 0", IETF Trust, Internet Draft, draft-ietf-roll-of0-11, May 2011, 12 pages.

Vassur, et al, "Routing Metrics Used for Path Calculation in Low Power and Lossy Networks", IETF Trust, Network Working Group, Internet-Draft, draft-ietf-roll-routing-metrics-19, Mar. 2011, 31 pages.

Winter; et al., "RPL: IPv6 Routing Protocol for Low-Power and Lossy Networks", Internet Engineering Task Force, Request for Comments 6550, Mar. 2012, 158 pages.

* cited by examiner

DISTRIBUTED NODE MIGRATION BETWEEN ROUTING DOMAINS

RELATED APPLICATION

The present application claims priority to U.S. Provisional Patent Application Ser. No. 61/636,117, filed Apr. 20, 2012, entitled DISTRIBUTED NODE MIGRATION BETWEEN ROUTING DOMAINS, by Hui et al., the contents of which are hereby incorporated by reference.

TECHNICAL FIELD

The present disclosure relates generally to computer networks, and, more particularly, to routing domain migration.

BACKGROUND

Low power and Lossy Networks (LLNs), e.g., sensor networks, have a myriad of applications, such as Smart Grids and Smart Cities. Various challenges are presented with LLNs, such as lossy links, low bandwidth, battery operation, low memory and/or processing capability, etc. One example routing solution implemented to address LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

For a number of reasons, the LLN Border Router (LBR) or DAG root typically represents the network's bottleneck. For instance, the LBR may be both a communication bottleneck (e.g., where a vast majority of traffic flows through the LBR) as well as a memory bottleneck (e.g., storing per-node state for each node in the network). In addition, the effect of LBR failures on an LLN can be particularly problematic to mitigate, particularly since all of the nodes within the LLN of the failed LBR must migrate to a new LLN and associated LBR.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
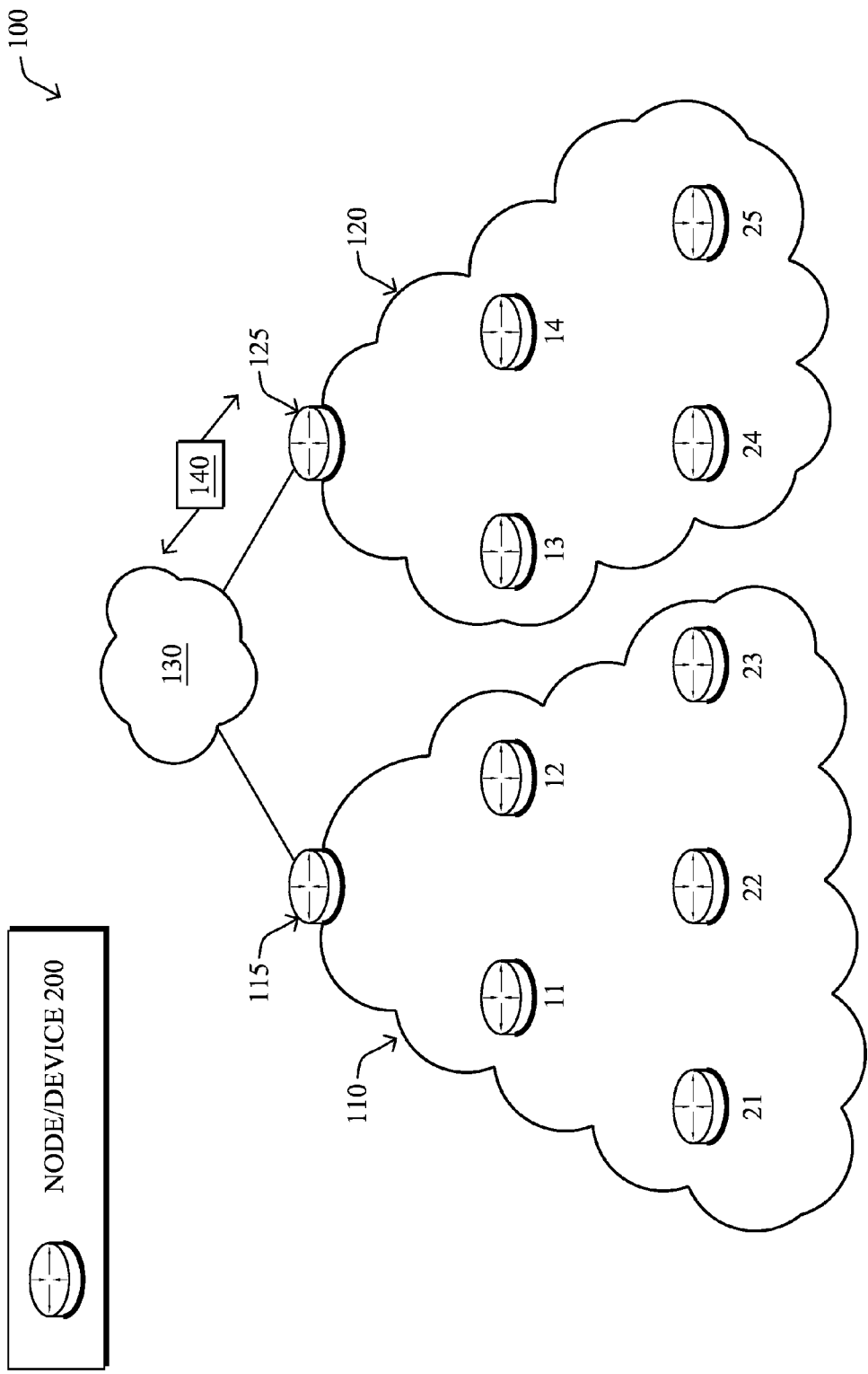
FIG. 1 illustrates an example computer network.

According to one or more aspects of the disclosure, a computerized method for determining routing domain migration for a device connected to a network is provided and may comprise receiving at a network interface a first network size indicator for a first network and a second network size indicator for a second network. A difference between the first network size indicator and the second network size indicator is determined and a switching probability is calculated if the difference between the network size indicators is greater than a predetermined network size difference threshold. The device may then migrate from the first network to the second network based on the switching probability.

Description

A computer network is a geographically distributed collection of nodes/devices interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such is as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices/nodes such as sensors, etc., that cooperatively monitor physical or environmental conditions at different locations, such as, e.g., energy/power consumption, resource consumption (e.g., water/gas/etc. for advanced metering infrastructure or "AMI" applications), temperature, pressure, vibration, sound, radiation, motion, pollutants, etc. Other types of smart objects include actuators, which may include functionality for turning on/off an engine or performing any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, 11-14 and 21-25, and described in more detail below) interconnected by various methods of communication. For instance, the communication links between devices 200 may be shared media (e.g., wireless links, PLC links, etc.), where certain devices 200, such as, e.g., routers, sensors, computers, etc., may be in communication with other devices 200, e.g., based on distance, signal strength, current operational status, location, etc. Other devices 200, such as ingress routers 115 and 125, may provide access for particular routing domains, 110 and 120, respectively, which may be directly interconnected, or else connected via a network 130 (e.g., a WAN or LAN) as shown.

Those skilled in the art will understand that any number of nodes/devices, communication links, etc. may be used in the computer network 100, and that the view shown herein is for simplicity. Also, those skilled in the art will understand that while nodes/devices 115 and 125 are referred to as "ingress routers," their functionality can provide connectivity into and out of the routing domains.

Data packets 140 (e.g., traffic and/or messages sent between the devices/nodes 200) may be exchanged among the nodes/devices 200 of the computer network 100 using predefined network communication protocols such as certain known wired or wireless protocols (e.g., IEEE Std. 802.15.4 (or 15.4 g), WiFi, Bluetooth®, etc.) or other shared media protocols where appropriate (e.g., PLC). In this context, a protocol includes a set of rules defining how the nodes interact with each other.

Figure 2:
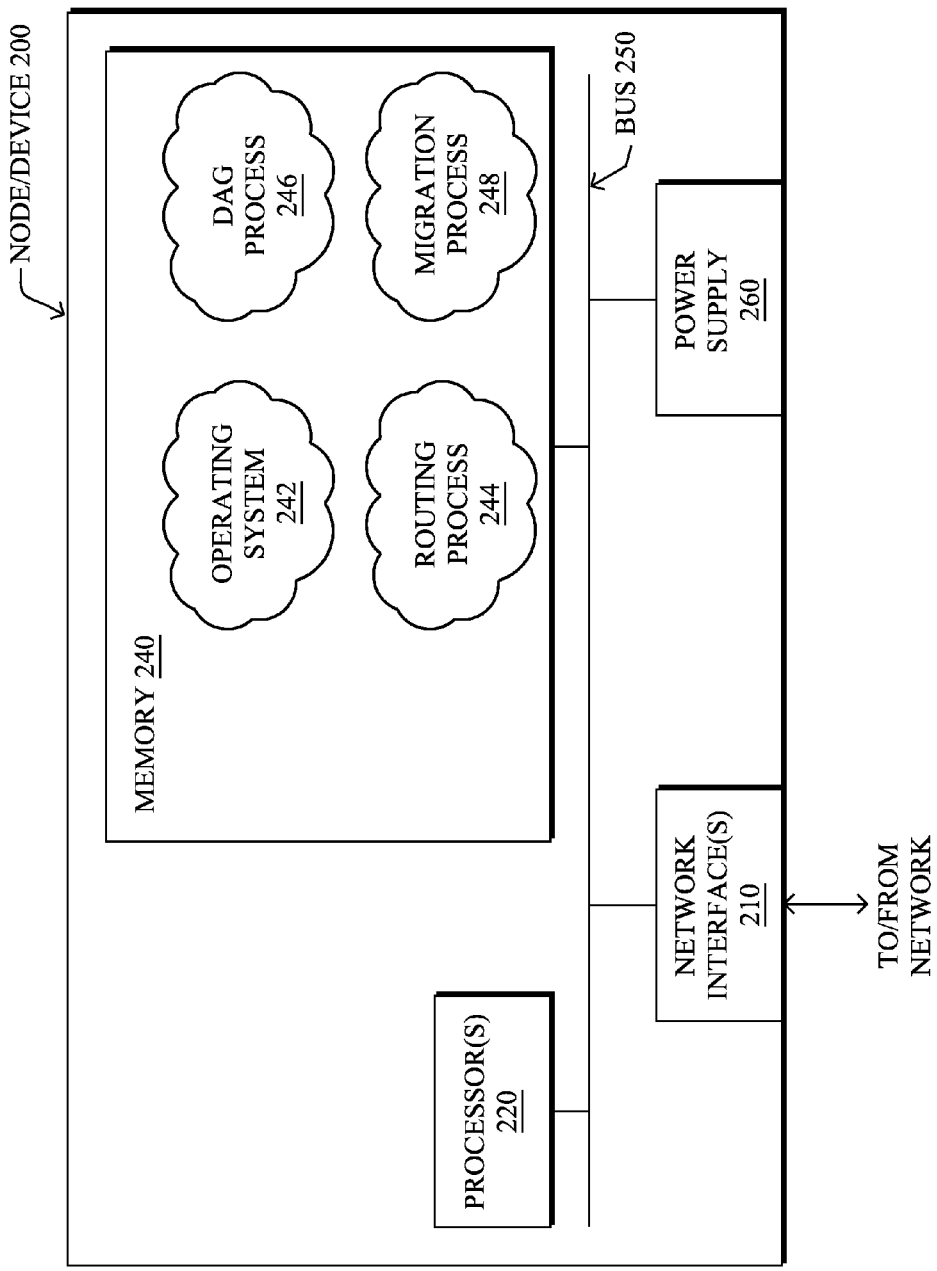
FIG. 2 illustrates an example network device/node.

FIG. 2 is a schematic block diagram of an example device 200 that may be used with one or more embodiments described herein, e.g., as a node/device 11-14 or 21-25 and/or an ingress router 115/125. The device 200 may comprise one or more network interfaces 210, at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links coupled to the network 100 (e.g., wired, wirelessly, via PLC, etc.). The network interfaces 210 may be configured to transmit and/or receive data using one or more different communication protocols, particularly depending upon the underlying transmission medium (e.g., wireless, PLC, wired, etc.). Note, further, that a device 200 may have one or more different types of network connections 210, namely, wireless and wired/physical connections, and that the view herein is merely for illustration. For example, the ingress routers 115/125, such as field area routers (FARs), may comprise a wired connection to network 130, and a wireless connection to the devices 11-14 and 21-25 within the domain. Also, while the network interface 210 is shown separately from power supply 260, in certain embodiments (e.g., PLC) the network interface 210 may communicate through the power supply 260, or may be an integral component of the power supply 260. In some specific configurations the PLC signal may be coupled to the power line feeding into the power supply 260.

The memory 240 comprises a plurality of storage locations that are addressable by the processor 220 and the network interface(s) 210 for storing software programs and data structures associated with the embodiments described herein. The processor 220 may comprise necessary elements or logic adapted to execute the software programs and manipulate the data structures. An operating system 242, portions of which are typically resident in memory 240 and executed by the processor 220, functionally organizes the device by, inter alia, invoking operations in support of software processes and/or services executing on the device 200. For instance, these software processes and/or services may comprise routing process/services 244, which may include a directed acyclic graph (DAG) process 246 in certain embodiments, and also an illustrative routing domain migration process 248 as described herein, among other things. Note that while routing domain migration process 248 is shown in centralized memory 240, alternative embodiments provide for the process 248 to be specifically operated within the network interfaces 210, such as a component of a MAC layer.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine is which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL may generally be described as a distance vector routing protocol that builds a Directed Acyclic Graph (DAG) for use in routing traffic/packets, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks"<draft-ietf-roll-routing-metrics-19> by Vasseur, et al. (Mar. 1, 2011 version). Further, an example OF (e.g., a default OF) may be found in an IETF Internet Draft, entitled "RPL Objective Function 0"<draft-ietf-roll-of 0-11> by Thubert (May 5, 2011 version) and "The Minimum Rank Objective Function with Hysteresis" <draft-ietf-roll-minrank-hysteresis-of-03> by O. Gnawali et al. (May 3, 2011 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
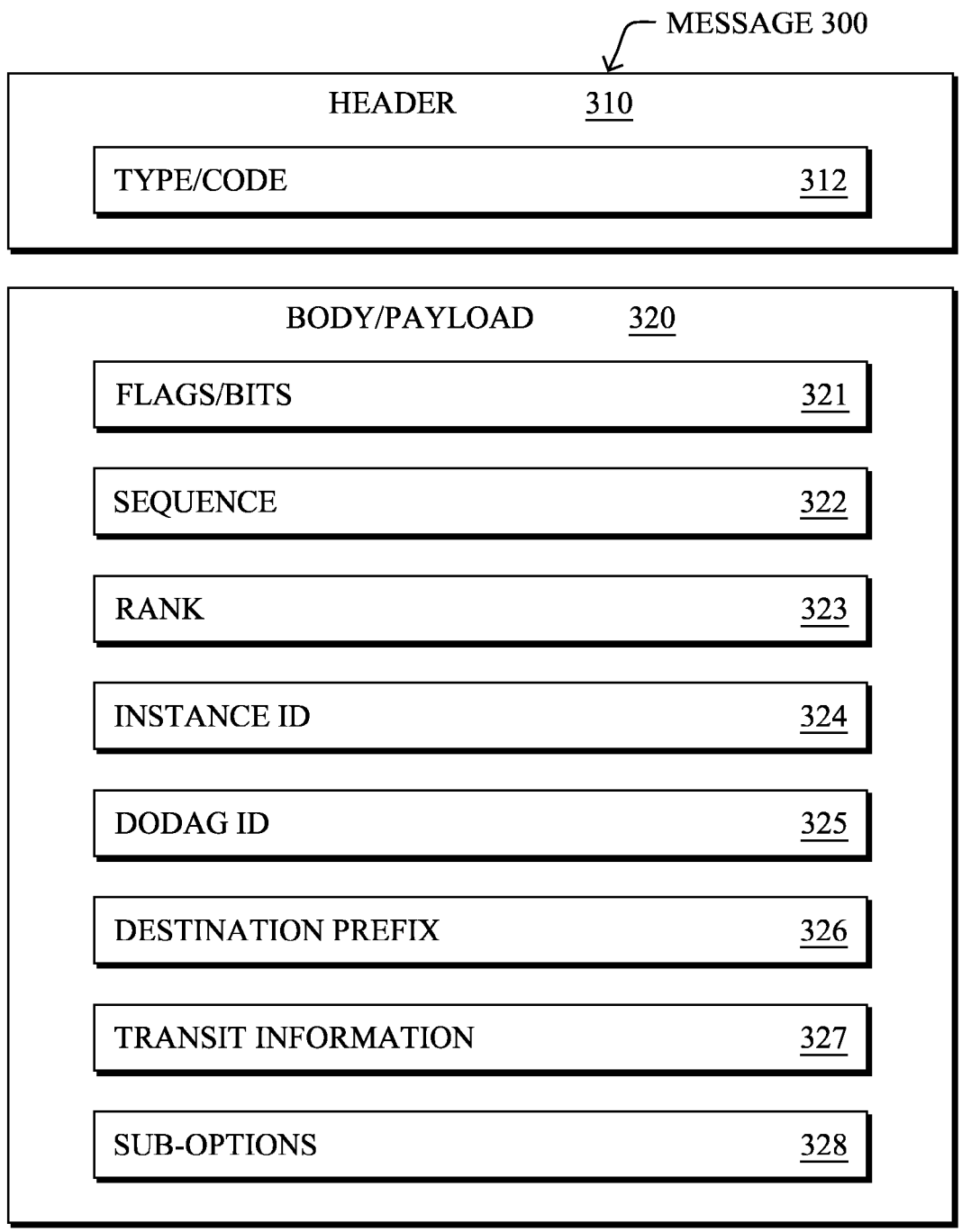
FIG. 3 illustrates an example simplified control message format.

FIG. 3 illustrates an example simplified control message 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message 300 may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
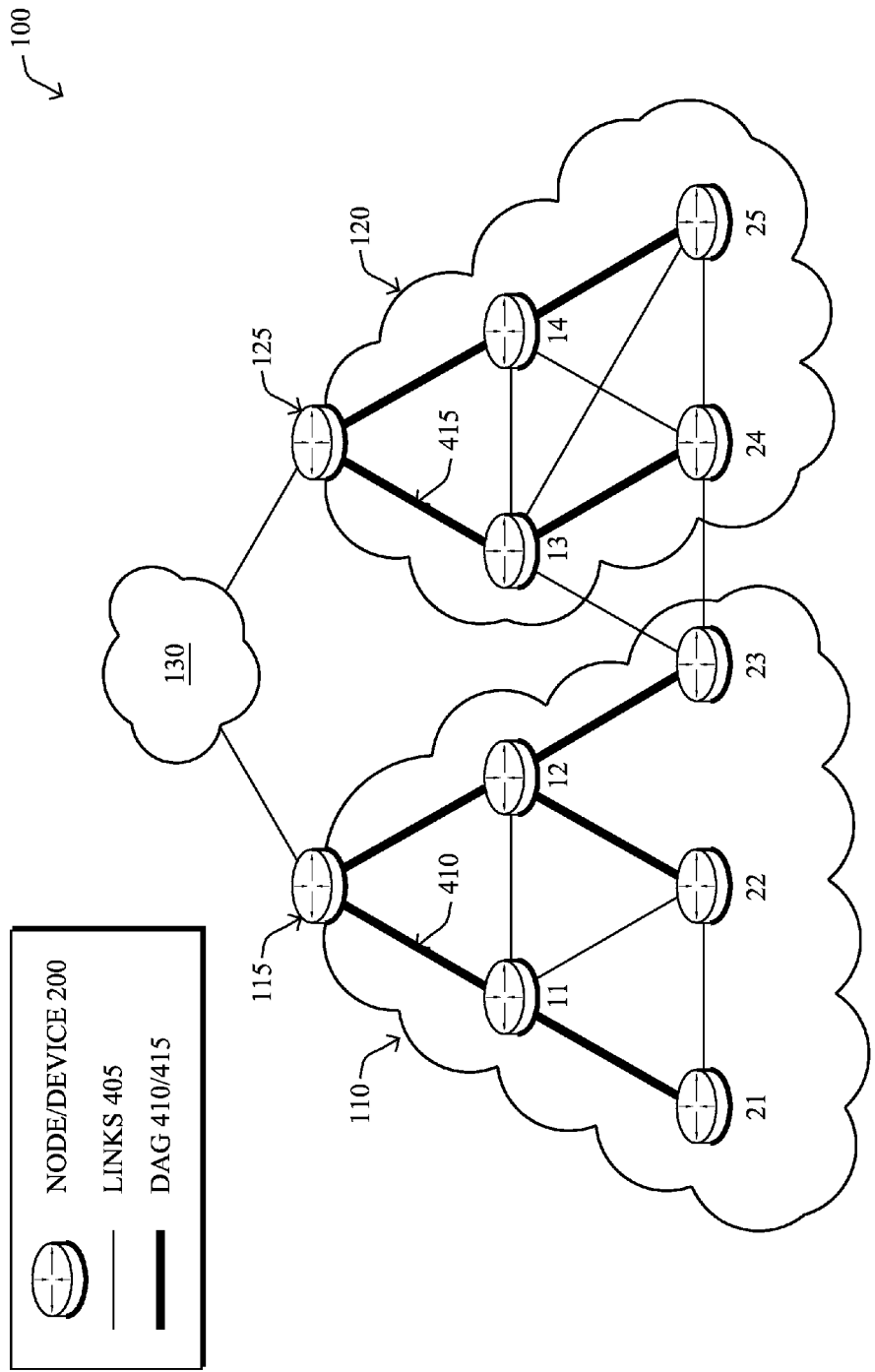
FIG. 4 illustrates an example of directed acyclic graphs (DAGs) in the computer network of FIG. 1.

FIG. 4 illustrates an example pair of simplified DAGs 410 and 415 that may be created, e.g., through the techniques described above, within network 100 of FIG. 1, and that may illustratively define an example pair of corresponding routing domains 110/120. For instance, certain links 405 may be selected for each node to communicate with a particular parent (and thus, in the reverse, to communicate with a child, if one exists). These selected links form the DAGs 410/415 (shown as bolded lines), which extend from a root node (e.g., a respective ingress router 115/125) toward one or more leaf nodes (nodes without children). Traffic/packets 140 (shown in FIG. 1) may then traverse the DAGs 410/415 in either the upward direction toward the root or downward toward the leaf nodes, particularly as described herein. Note that while the embodiments are shown herein with reference to a generally "tree" shaped network, the description herein is not so limited, and may be applied to networks that have branches emitting to all directions from with the root node generally centralized among a plurality of surrounding nodes.

Large scale LLNs are typically divided into smaller more manageable sub-networks or routing domains (often called a personal area network or "PAN", such as when using IEEE 802.15.4 terminology). At the network layer, devices participate in only one routing domain at a time. To join a routing domain, devices generally must obtain a link-layer group key via access control mechanisms, configure IP routes to other devices in the same routing domain, and obtain global IP addresses that are topologically correct. Typically, each routing domain is assigned a unique prefix and all devices within a routing domain configure global IP addresses using the routing domain's prefix. (Note that ensuring that all IP addresses in a routing domain (e.g., PAN) are formed from the same prefix maximizes the benefits of route aggregation and header compression.)

Due to the scale and embedded nature of LLNs, devices autonomously join a routing domain and form associated routes to allow the forwarding of traffic. From time to time, LLN devices may choose to switch to a different routing domain, called routing domain migration. For example, one cause of routing domain migration is the loss of connectivity to other devices in the routing domain. Another cause is an attempt to optimize communication performance (e.g., by moving to a routing domain that advertises a lower route cost).

Figure 5A:
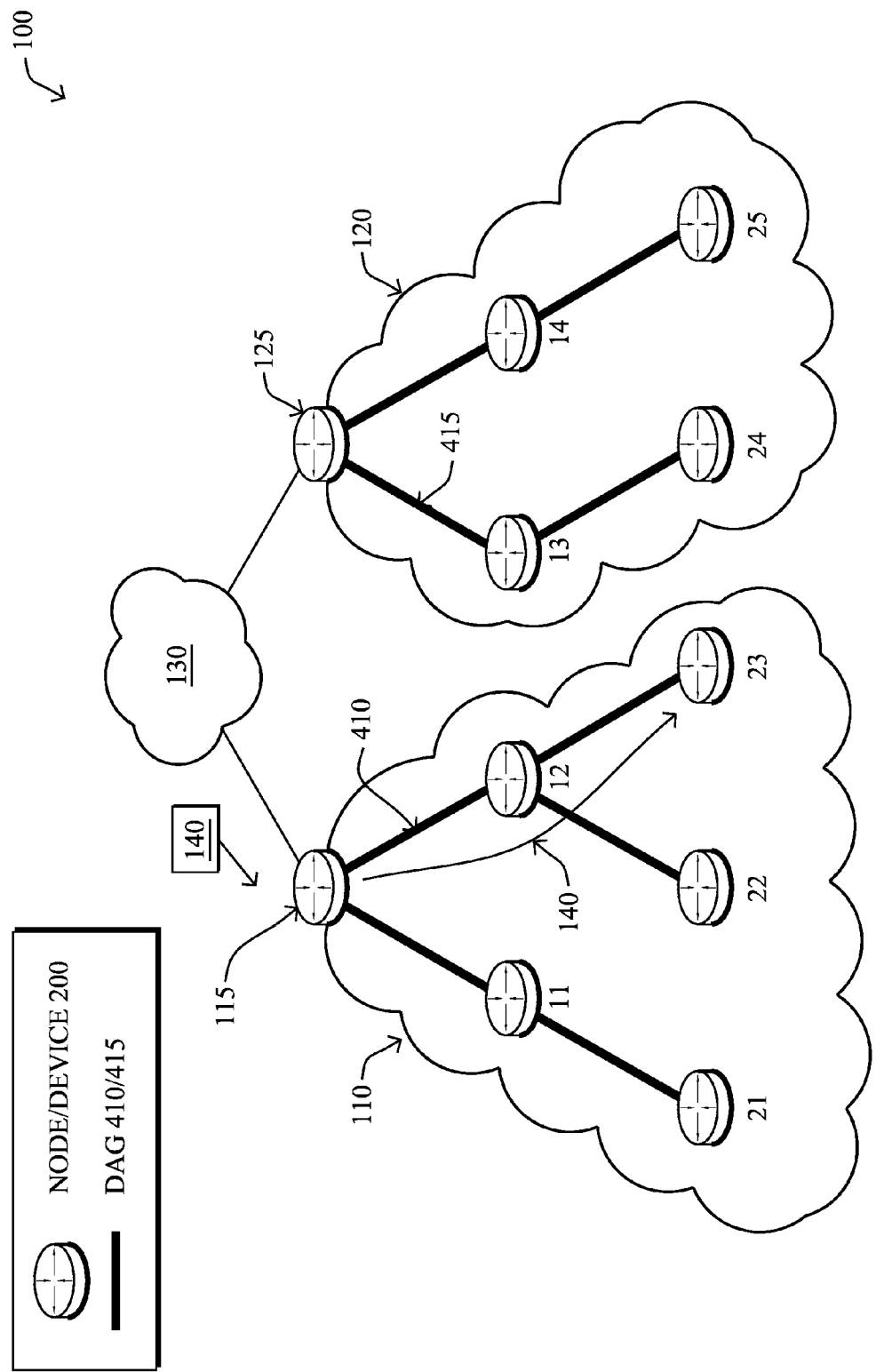
FIGS. 5A-5C illustrate an example of a routing domain migration.
Figure 5B:
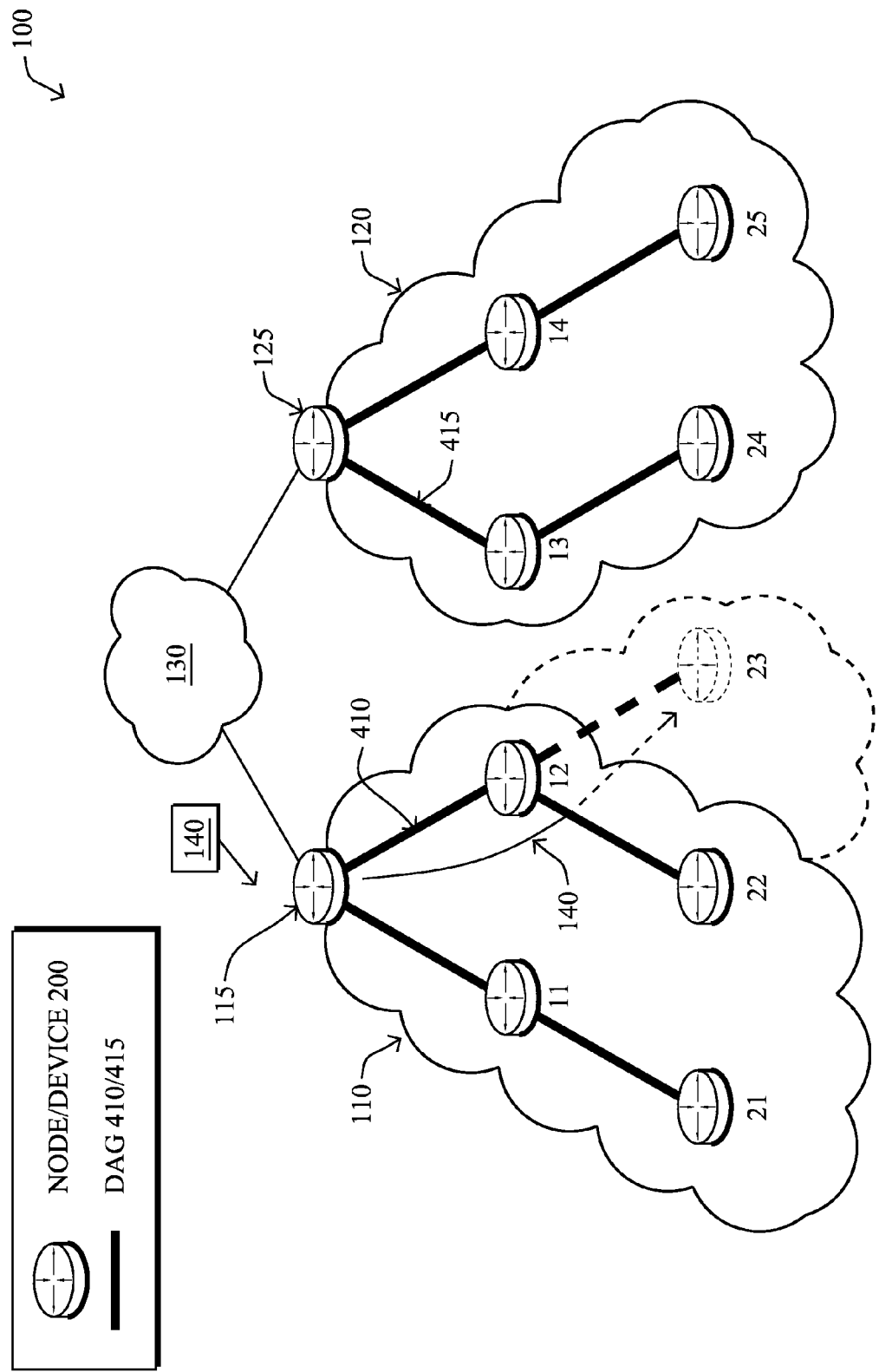
Figure 5C:
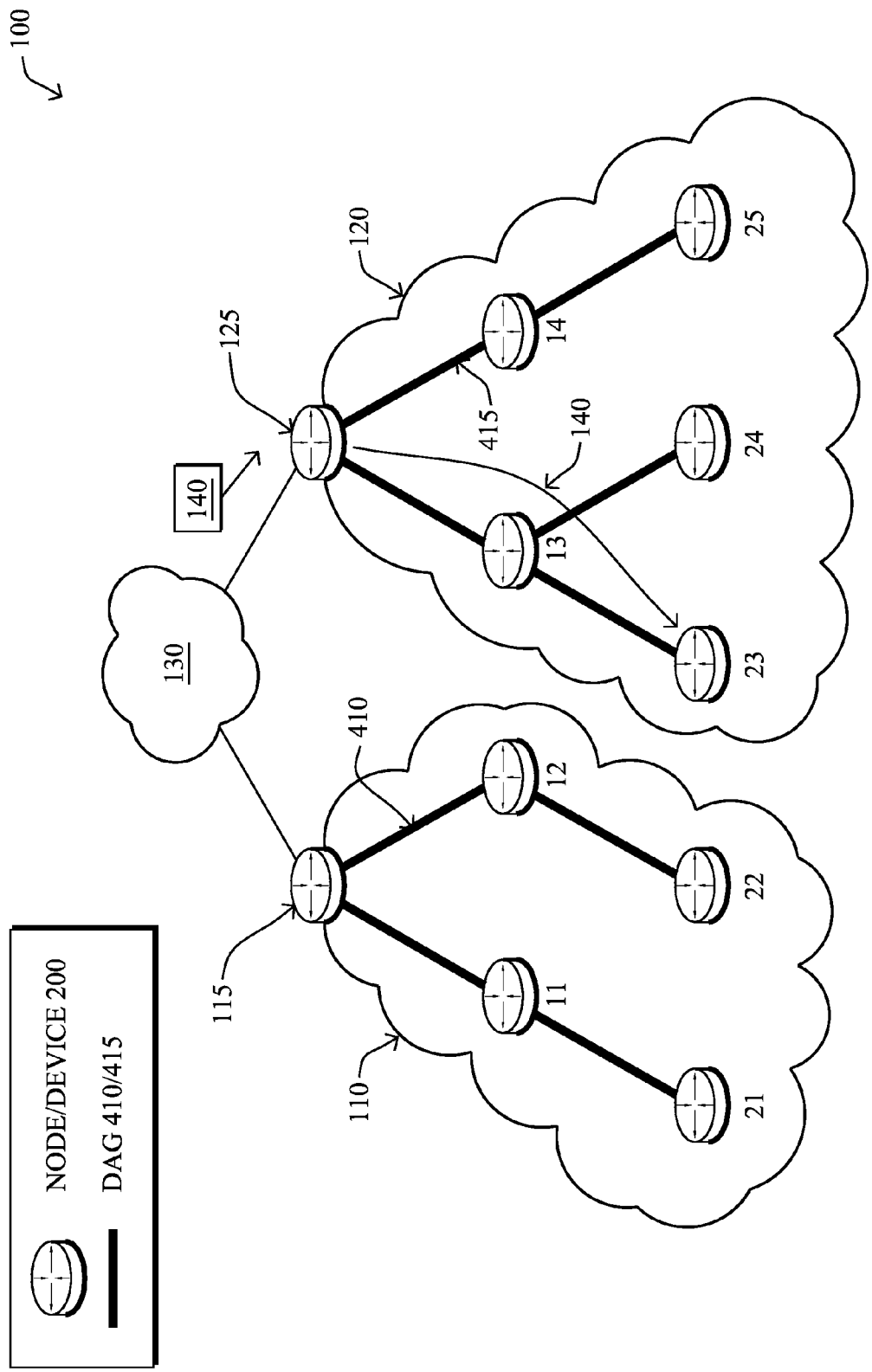

Illustratively, FIGS. 5A-5C demonstrate an example of node migration between the first routing domain 110 and second routing domain 120 as in FIG. 1 above. For instance, FIG. 5A shows a first ingress router 115 of a first routing domain 110, e.g., the root of a DAG 410, transmitting all packets 140 to the corresponding device within the routing domain, e.g., to device 23. At some point, device 23 migrates to the second routing domain 120, e.g., DAG 415, thus certain packets 140 may no longer reach device 23 in first routing domain 110, as shown in FIG. 5B. Once the migrating node has established itself in the new domain, future traffic packets 140 to the migrated device should be destined via the new routing domain in accordance with network convergence as shown in FIG. 5C, e.g., where device 23 has joined the second routing domain 120 (e.g., and having a newly associated IP address) with the second ingress router (LBR) 125.

As noted above, for a number of reasons, the LLN Border Router (LBR) or DAG root typically represents the network's bottleneck, such as:

1) Communication bottleneck—One typical property of LLN applications (e.g., AMI) is that traffic flows typically traverse the LBR. In particular, the vast majority of traffic within a LLN either flows from the LBR to a LLN device or from an LLN device to an LBR. Another typical property of LLN applications is that the vast majority of devices generate some amount of constant-rate traffic through the LBR. Such traffic includes control-plane traffic (e.g., periodic DAO messages in RPL to report DODAG parents) and data-plane traffic (e.g., periodic meter reads sent to a collection engine). The amount of constant-rate traffic that the LBR/root experiences typically grows linearly with the number of nodes.

2) Memory bottleneck—The LBR must generally maintain a per-node state for each node in its network. Such state includes maintaining the routing topology (e.g., RPL DODAGs) and security state (e.g., IEEE 802.1x Pairwise Master Key and IEEE 802.11 Pairwise Temporal Keys and Replay Counters).

One way to alleviate resource load on the LBR is to increase the ratio of LBRs to endpoints. This can be done by adding additional LBRs or additional LLN interfaces to the LBR. In both cases, each additional LLN interface may serve as a DODAG root. However, if the devices are unable to organize themselves in a way that balances the resource load on deployed LBRs, then increasing the ratio of LBRs to endpoints (devices) is futile.

Another important reason to balance resource load across LBRs is to minimize the effect of LBR failures. Balancing the resource load across different LLN interfaces helps minimize the worst-case effect of a single LBR failure. For example, balancing the resource load helps to minimize the maximum traffic load through any single LLN interface. Furthermore, balancing the resource load helps to minimize the maximum number of nodes/devices attached to any single LLN interface. This is important to minimize the time it takes for devices to change networks in the event of an LBR failure (often called failover time).

Distributed Node Migration

The example techniques herein propose a distributed mechanism that allows devices to move between different DAGs/routing domains (e.g., LLNs) to balance the resource load between different root nodes (e.g., LBRs), notably without requiring the root node to maintain any per-node state. With the techniques herein, root nodes compute the size of the network, and optionally the traffic load, and propagate the information to all devices in the network. Devices use the information from their current network and other neighboring networks to determine whether or not to switch by computing a probability and optionally performing a weighted selection algorithm (e.g., "coin-toss"). In addition, the root node may include an optional weight value to indicate the amount of resources it has.

Illustratively, the techniques described herein may be performed by hardware, software, and/or firmware, such as in accordance with illustrative migration process 248, which may include computer executable instructions executed by processor 220 to perform functions relating to the example techniques described herein. For example, the techniques herein may be treated as extensions to conventional protocols, such as the RPL protocol, and as such, would be processed by similar components understood in the art that execute the RPL protocol, accordingly. Also, while the techniques herein generally indicate that the ingress router (e.g., an LBR, root device, FAR, etc.) perform certain aspects of the techniques herein, other management devices or head-end applications (e.g., network management services or "NMS" servers, etc.) may also make use of the techniques herein, accordingly.

Operationally, the techniques herein use a distributed mechanism that allows devices to move between different DODAGs to balance the traffic load between different LBRs (ingress devices, FARs, root nodes, etc). By being distributed, the techniques herein use a decision process local to each node/device. Because the decision process is local to each node/device, the distributed process of the techniques herein is self-stabilizing.

Figure 6:
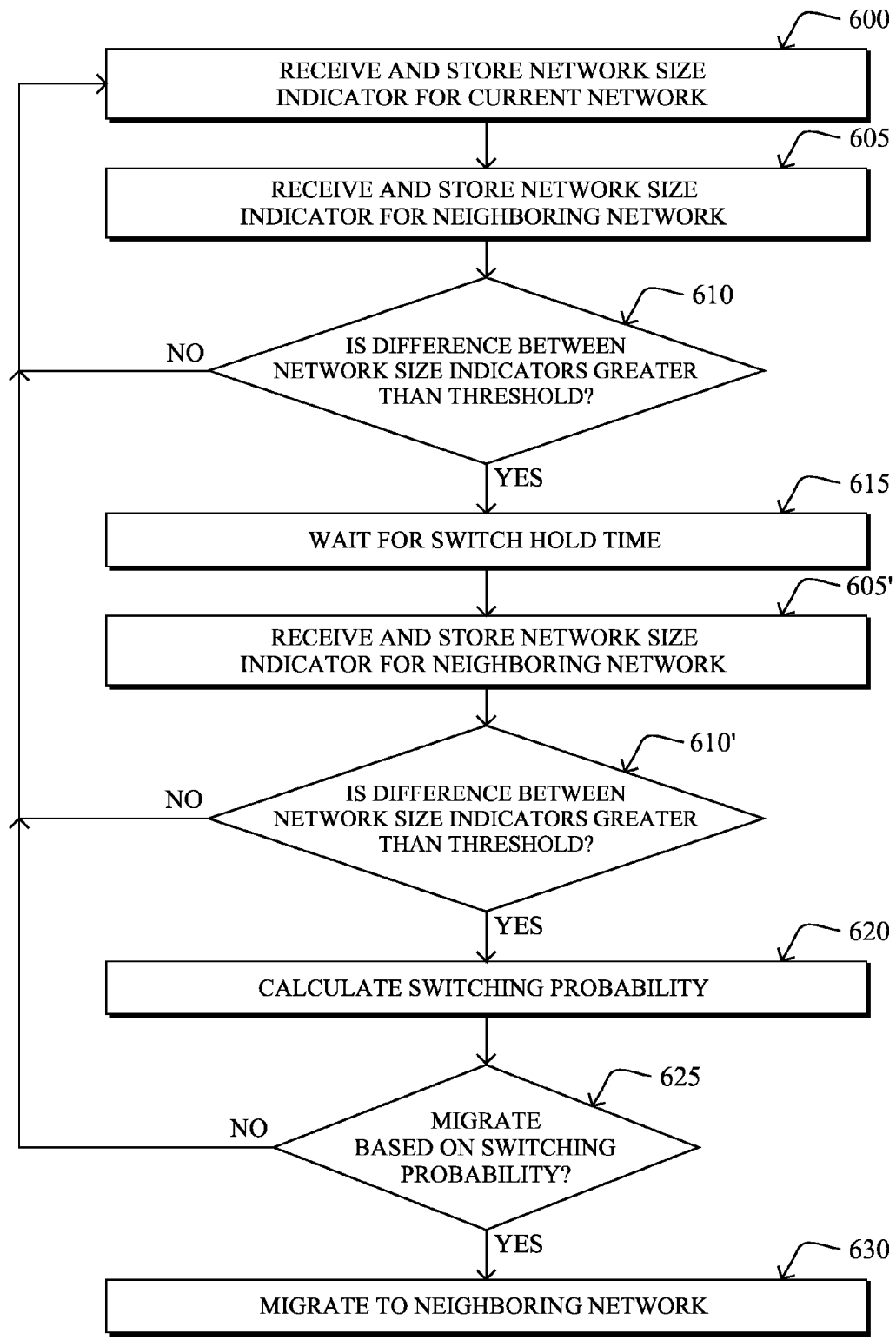
FIG. 6 illustrates an example of a procedure for determining routing domain migration.

FIG. 6 illustrates an example procedure for routing domain migration using the techniques described herein. A local process (e.g. migration process 248) on each device 200 monitors a Network Size (NetSize) indicator value of the network it is currently attached to and other surrounding networks.

At Step 600, the device 200 (e.g. device 23) receives a NetSize indicator for the network it is currently part of (e.g. routing domain 110) through its network interface 210 and stores the first NetSize indicator in memory 240. The newly defined NetSize indicator is included in routing beacons from the LBR (e.g. ingress router 115). When using RPL, the NetSize indicator may be determined by the DAO messages sent by each node in the network, and the NetSize indicator may be encoded in a DAG Metric Container (defined in draft-ietf-roll-routing-metrics). The LBR (e.g. ingress router 115) sets the NetSize indicator value and all other devices simply propagate the value throughout the network.

At Step 605, device 200 also receives a NetSize indicator for a neighboring network (e.g., routing domain 120) through its network interface 210 and stores the second NetSize indicator in memory 240. In general, the NetSize indicator for the neighboring network may be received through beacons and/or advertisements for the neighboring network, such as the DIO messages sent by roots of neighboring network DAGs (e.g., from ingress router 125). In particular, since certain nodes (e.g., node 23) may be able to join a plurality of different networks, those nodes may accordingly receive control messages (e.g., DAOs) for each possible network (e.g., for domain 110 and 120).

At Step 610, when a NetSize indicator is received from a neighboring network, the device 200 compares it to the NetSize indicator of its current network. The local process run on processor 220 calculates the difference between the NetSize indicators to ensure that devices do not change networks when the NetSize indicators differ by less than a predetermined network size difference threshold. If the difference between the NetSize indicators is less than the network size difference threshold, the process returns to Step 600 and device 200 does not migrate to the neighboring network. If the difference between the NetSize indicators is greater than the network size difference threshold, the process continues with Step 615. This step essentially implements a hysteresis to ensure that devices do not attempt to switch networks when the NetSize indicators differ by only a small amount.

Note that in one or more illustrative embodiments, rather than indicating the exact NetSize of a given network, the local and/or neighboring network may adjust the advertised size by a "delta" amount (e.g., NetSize+delta), where delta is a value that essentially guides migration to/from a particular network as a whole. For instance, a very high delta would generally prevent nodes from migrating to a given network domain, while a very low delta (e.g., optionally negative) would generally entice nodes to migrate to a given domain. As an example, a newly established domain may wish to induce migration to itself (low/negative delta), while a heavily congested domain may wish to offload as many devices as possible (high delta). The value of delta may thus be dynamic over time, and set on a per-domain basis.

In certain embodiments, at Step 615, a time-delay may also be added to account for the time it takes for devices to switch networks and for the NetSize indicators to reflect the changes (e.g., the switch hold time). This step implements a low-pass filter that allows the networks state (i.e., NetSize) to reflect any network changes that occur. It takes time for a device to switch networks and the LBRs to notice the devices that have changed networks and reflect those changes in the NetSize indicator. For example, RPL specifies a Default Route lifetime for devices in the network. In one embodiment, the switch hold time is set to the Default Route lifetime if the DAO information is used to determine the NetSize value. In another embodiment, the switch hold time may be propagated in routing beacons to allow dynamic adjustment. The switch hold time specifies the time constant for the overall network migration mechanism.

After waiting the switch hold time, at Step 605', the device 200 receives a new NetSize indicator for the neighboring network (e.g., routing domain 120) through its network interface 210 and stores the new second NetSize indicator in memory 240 as described above for Step 605.

At Step 610', when the new NetSize indicator is received from the neighboring network, the device 200 again compares it to the NetSize indicator of its current network as described above for Step 610. If the difference between the NetSize indicators is less than the network size difference threshold, the process returns to Step 600 and device 200 does not migrate to the neighboring network. If the difference between the NetSize indicators is still greater than the network size difference threshold, the process continues with Step 620.

At Step 620, a switching probability is calculated to determine if device 200 should migrate to the neighboring network. In this example, the switching probability may be illustratively calculated as:

$$\frac{\text{weighting factor} * (\text{first network size} - \text{second network size})}{\text{first network size}},$$

where the weighting factor is used to control the number of devices that should consider switching between networks. For example, when the weighting factor=0.5, then half of the devices should consider switching. The switching probability may be set by the proportional difference between the two NetSize indicator values and dividing by NetSize_indicator value of the current network normalizes the value into a switching probability that each device can use in their local process. This step mitigates the "herding" effect of conventional techniques by using a randomized decision process with the switching probability computed based on the proportional difference between the NetSize indicator values.

At Step 625, device 200 determines whether or not to migrate from the current network to the neighboring network based on the calculated switching probability. For example, device 200 can perform a random trial and determine whether or not to migrate based on the outcome of the random trial relative to the calculated switching probability. As a concrete example, if a random trial or function returns a real number between 0.0 and 1.0 and the calculated switching probability was 0.3, the device 200 would migrate to the neighboring network if the random trial or function returned a value between 0.0 and 0.3. If device 200 determines that it should migrate to the neighboring network based on the random trial and the switching probability, the process continues with Step 630. Otherwise, the process returns to Step 600.

At Step 630 device 200 migrates to the neighboring network.

As a concrete example, consider two networks with the following NetSize indicator values: NetSize_A=1000, NetSize_B=100 and the Weighting Factor=0.5. The switching probability is computed as: 0.5*(1000−100)/1000=0.45. One thousand (1000) devices choosing to switch with 0.45 probability means about 450 devices will attempt to switch routing domains. Assuming 450 devices actually switch, the new network sizes will be balanced at 550 devices per network.

For 0<weighting factor<1, it can be mathematically proven that the difference in NetSize between networks goes to zero, as shown in the following example.

PAN_$A(t)$=Size of PAN $A$ at time $t$;

PAN_$B(t)$=Size of PAN $B$ at time $t$;

DIFF_$AB(t)$=|PAN_$A(t)$−PAN_$B(t)$|=Diff in size between PAN $A$ and PAN $B$ at time $t$;

PAN_$B(t)$=PAN_$A(t)$−DIFF_$AB(t)$;

PAN_$A(t+1)$=PAN_$A(t)$−WEIGHTING FACTOR*DIFF_$AB(t)$;

PAN_$B(t+1)$=PAN_$A(t)$−(1−WEIGHTING FACTOR)*DIFF_$AB(t)$;

DIFF_$AB(t+1)$=|PAN_$A(t+1)$−PAN_$B(t+1)$|=| (2*WEIGHTING FACTOR−1)|*DIFF_$AB(t)$.

The weighting factor controls the "stickiness" of devices attached to a network. For the load-balancing mechanism to be self-stabilizing, the weighting factor must be between 0 and 1. For 0<weighting factor<1.0, DIFF_AB(t) goes to zero as t goes to infinity. However, for weighting factor=0.5, DIFF_AB(t) goes to zero in a single step.

Note that the above examples will also apply for more than two networks. With more than two networks, for each round, a device will evaluate switching to some other network only once. That is because Step 615 limits each device to performing a single analysis in each round.

In some cases, it may be beneficial to choose 0<=weighting factor<0.5. This may be beneficial in cases where network stability is favored over balancing the network size. For example, in cases where Distribution Automation (DA) devices are used, they may utilize TCP or have strict SLAs which are much more sensitive to devices switching networks. In certain cases, it may be beneficial to set weighting factor=0, which effectively disables network migration for nodes when network stability is of utmost importance (e.g., specific Distribution Automation cases). The value of the weighting factor may be included in a newly defined TLV in beacons so that they can be configured over the network.

In addition, there may be different categories of network migration or "changing networks". In the case of RPL, a device may decide to change between different DODAGs within the same RPL Instance. In another case, a device may decide to change PANs. Switching PANs is a much more disruptive operation because it involves the link layer and may require frequency-hopping synchronization, link-layer authentication/keying, etc. For these reasons, the weighting value may be different depending on the kind of network change that the device is evaluating. The weighting factor(s) may be configured over the network by defining a new TLV that may be placed in the messages.

Figure 7:
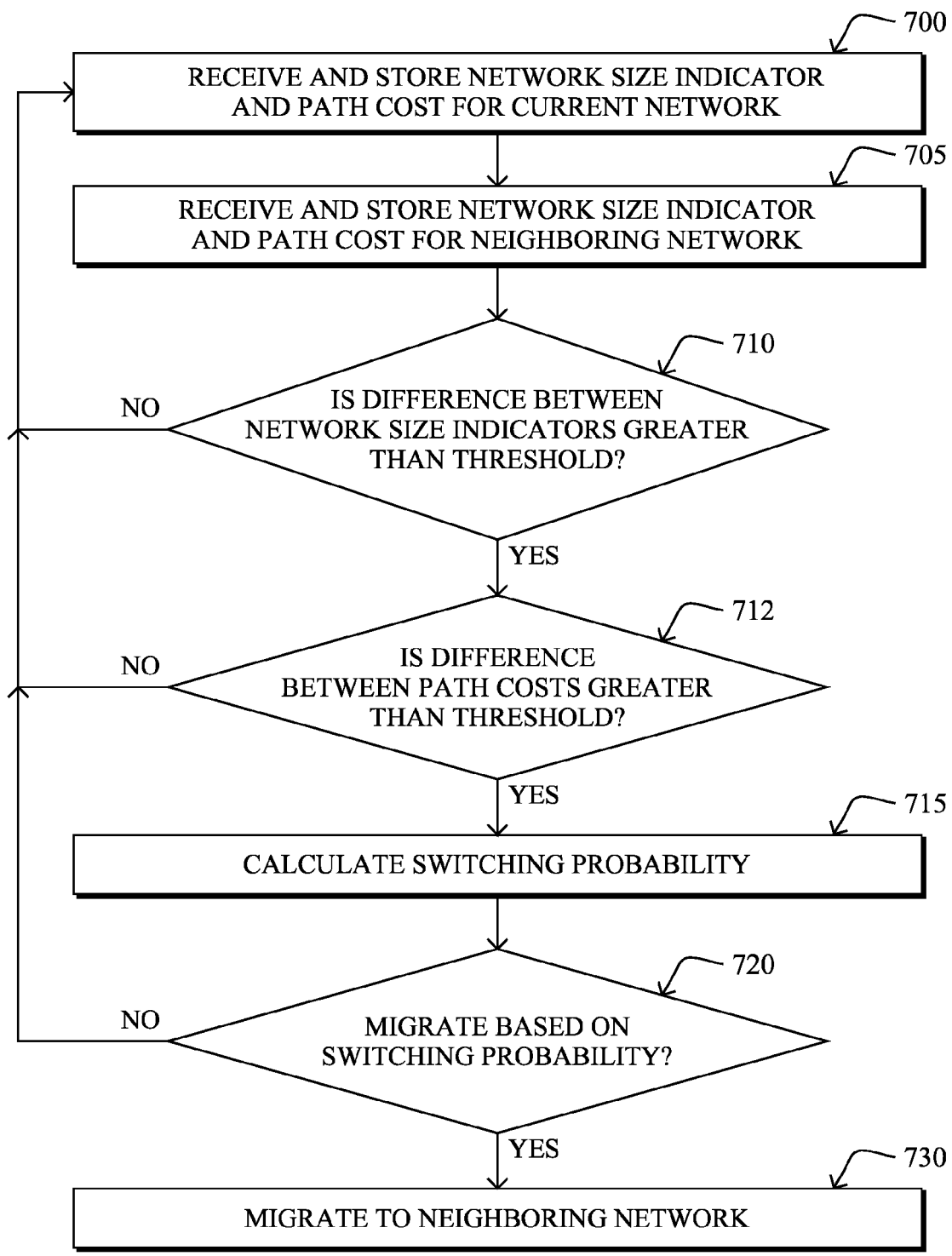
FIG. 7 illustrates another example of a procedure for determining routing domain migration using a path cost.

FIG. 7 illustrates another example procedure for routing domain migration using the techniques described herein, which includes a Path Cost difference as part of the load-balancing logic. In this example, a local process (e.g., migration process 248) on each device 200 monitors a NetSize indicator and a Path Cost to the LBR, as computed by a routing protocol such as RPL, of the network it is currently attached to and other surrounding networks.

At Step 700, a device 200 (e.g. device 23) receives a NetSize indicator and a Path Cost (e.g., hop count, cost metrics, etc., as will be understood by those skilled in the art) for the network it is currently part of (e.g., routing domain 110) through its network interface 210 and stores the first NetSize indicator and first Path Cost in memory 240. The newly defined NetSize indicator and Path Cost are included in routing beacons from the ingress router 115. When using RPL, the NetSize indicator and Path Cost may be determined by the DAO messages sent by each node in the network, and the NetSize indicator and Path Cost may be encoded in a DAG Metric Container, which is used in the DIO (defined in draft-ietf-roll-routing-metrics). The LBR (e.g. ingress router 115) sets the NetSize indicator value and Path Cost and all other devices simply propagate the value throughout the network.

At Step 705, device 200 receives a NetSize indicator and a Path Cost for a neighboring network (e.g. routing domain 120) through its network interface 210 and stores the second NetSize indicator and second Path Cost in memory 240, as described above.

At Step 710, when a NetSize indicator and Path Cost are received from a neighboring network, device 200 compares the new NetSize indicator to the NetSize indicator value of its current network. The local process run on processor 220 calculates the difference between the NetSize indicators to ensure that devices do not change networks when the NetSize values differ by less than a predetermined network size difference threshold. If the difference between the NetSize indicators is less than the network size difference threshold, the process returns to Step 700 and device 200 does not migrate to the neighboring network. If the difference between the NetSize indicators is greater than the network size difference threshold, the process continues with Step 712. This step essentially implements a hysteresis to ensure that devices do not attempt to switch networks when NetSize indicators differ by only a small amount.

At Step 712, device 200 compares the Path Cost of the neighboring network to the Path Cost of its current network. The local process run on processor 220 calculates the difference between the Path Costs to prevent network changes if joining the neighboring network will increase the Path Cost by some path cost threshold. The path cost threshold may be a fixed value (e.g., ETX=3.0) or some proportional value (e.g., 10% of current Path Cost). If the difference between the Path Costs is less than the path cost threshold, the process returns to Step 700 and device 200 does not migrate to the neighboring network. If the difference between the Path Costs is greater than the path cost threshold, the process continues with Step 715. Alternatively, rather than using separate comparisons of NetSize and Path Cost, a linear combination of difference in Path Cost and NetSize can be used. For example, X*PathCostDiff+Y*NetSizeDiff<Switch_Thresh, where X and Y are the relative weights for the Path Cost and NetSize, respectively. Generally, the values for X and Y may be set by a network administrator, and may or may not be shared by each device in the network. As a simple example, a value of "1" for X and a value of "2" for Y would indicate that NetSizeDiff is twice as important of a factor as the PathCostDiff.

At Step 715, a switching probability is calculated to determine if device 200 should migrate to the neighboring domain, as described for Step 620 above. At this point, rather than calculating the switching probability immediately, device 200 may also wait for a switch hold time and reevaluate the network size and path cost after the switch hold time as described in Steps 615 and 605'-610' above before calculating the switching probability.

At Step 720, device 200 determines whether or not to migrate from the current network to the neighboring network based on the calculated switching probability, as discussed in Step 625 above. If device 200 determines that it should migrate to the neighboring network based on the random trial and the switching probability, at Step 730 device 200 migrates to the neighboring network. Otherwise, the process returns to Step 700.

Figure 8:
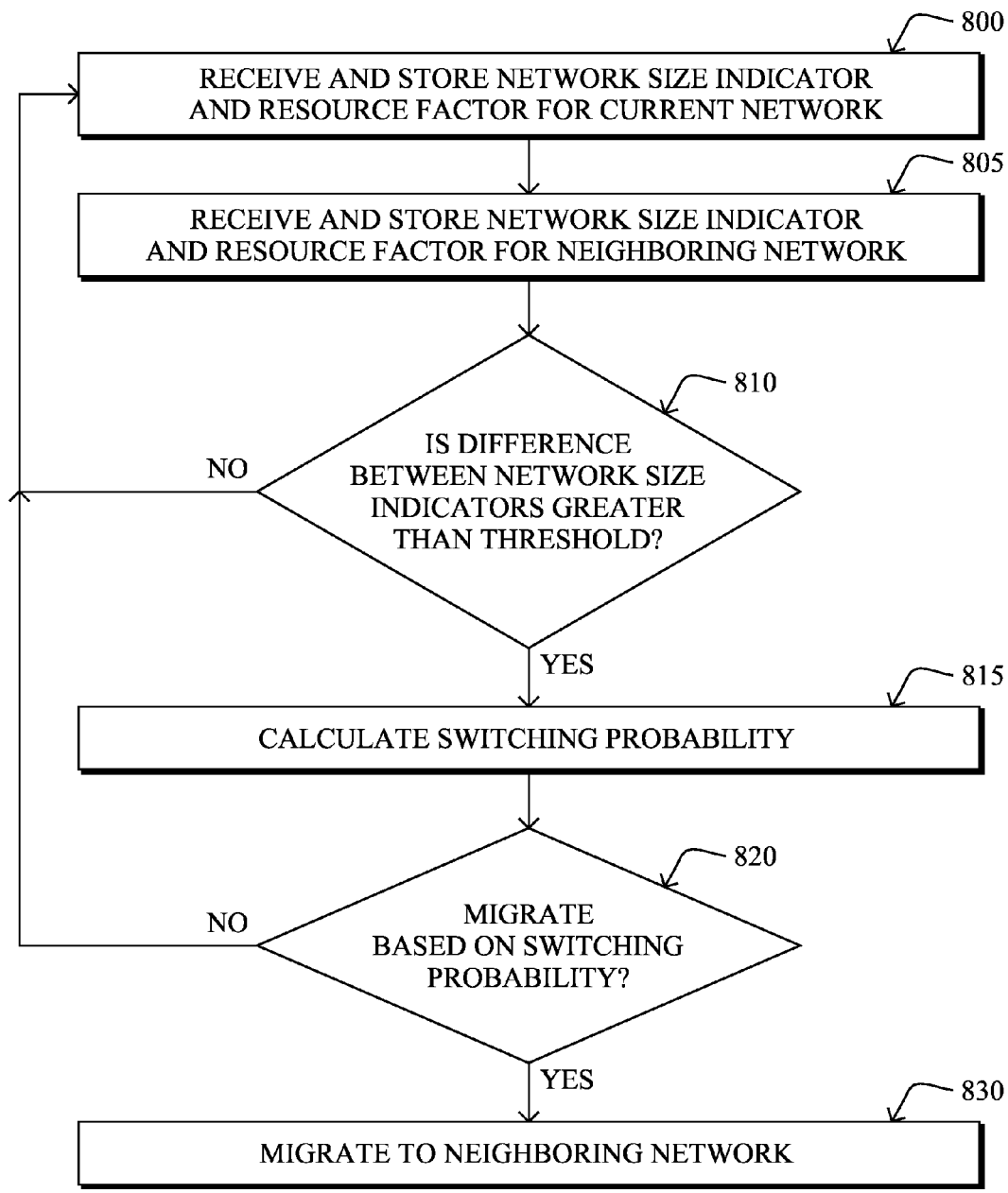
FIG. 8 illustrates another example of a procedure for determining routing domain migration using a resource factor.

FIG. 8 illustrates another example procedure for routing domain migration using the techniques described herein, which includes using a resource factor in determining migration. The LBR sets the resource factor and all other devices simply propagate the value throughout the network. The LBR may use the resource factor to convey differences in its capabilities. This is useful when different LBRs can have very different resource capacities (e.g., memory, computation, or communication). In this example, a local process (e.g. migration process 248) on each device 200 monitors a NetSize indicator value and a resource factor of the network it is currently attached to and other surrounding networks.

At Step 800, device 200 (e.g. device 23) receives a NetSize indicator and a resource factor for the network it is currently part of (e.g. routing domain 110) through its network interface 210 and stores the first NetSize indicator and first resource factor in memory 240. The newly defined NetSize indicator and resource factor are included in routing beacons from the ingress router 115. When using RPL, the NetSize indicator and resource factor may be determined by the DAO messages sent by each device in the network, and the NetSize indicator and resource factor may be encoded in a DAG Metric Container, which is used in the DIO (defined in draft-ietf-roll-routing-metrics). The LBR (e.g. ingress router 115) sets the NetSize indicator value and resource factor and all other devices simply propagate the value throughout the network.

At Step 805, device 200 receives a NetSize indicator and a resource factor for a neighboring network (e.g. routing domain 120) through its network interface 210 and stores the second NetSize indicator and second resource factor in memory 240.

At Step 810, when a NetSize indicator and resource factor are received from a neighboring network, device 200 compares the new NetSize indicator to the NetSize indicator value of its current network, as described in Step 610 above. If the difference between the NetSize indicators is less than the network size difference threshold, the process returns to Step 800 and device 200 does not migrate to the neighboring network. If the difference between the NetSize indicators is greater than the network size difference threshold, the process continues with Step 815.

At Step 815, a switching probability is calculated to determine if device 200 should migrate to the neighboring network. In this example, the switching probability may be calculated as:

$$\frac{\text{weighting factor} * (\text{first resource factor} * \text{first network size} - \text{second resource factor} * \text{second network size})}{\text{first resource factor} * \text{first network size}},$$

where the weighting factor is used to control the number of devices that should consider switching between networks, as described in Step 620 above. At this point, rather than calculating the switching probability immediately, device 200 may also wait for a switch hold time and reevaluate the network size after the switch hold time as described in Steps 615 and 605'-610' above before calculating the switching probability.

At Step 820, device 200 determines whether or not to migrate from the current network to the neighboring network based on the calculated switching probability, as discussed in Step 625 above. If device 200 determines that it should migrate to the neighboring network based on the random trial and the switching probability, at Step 830 device 200 migrates to the neighboring network. Otherwise, the process returns to Step 800.

Figure 9:
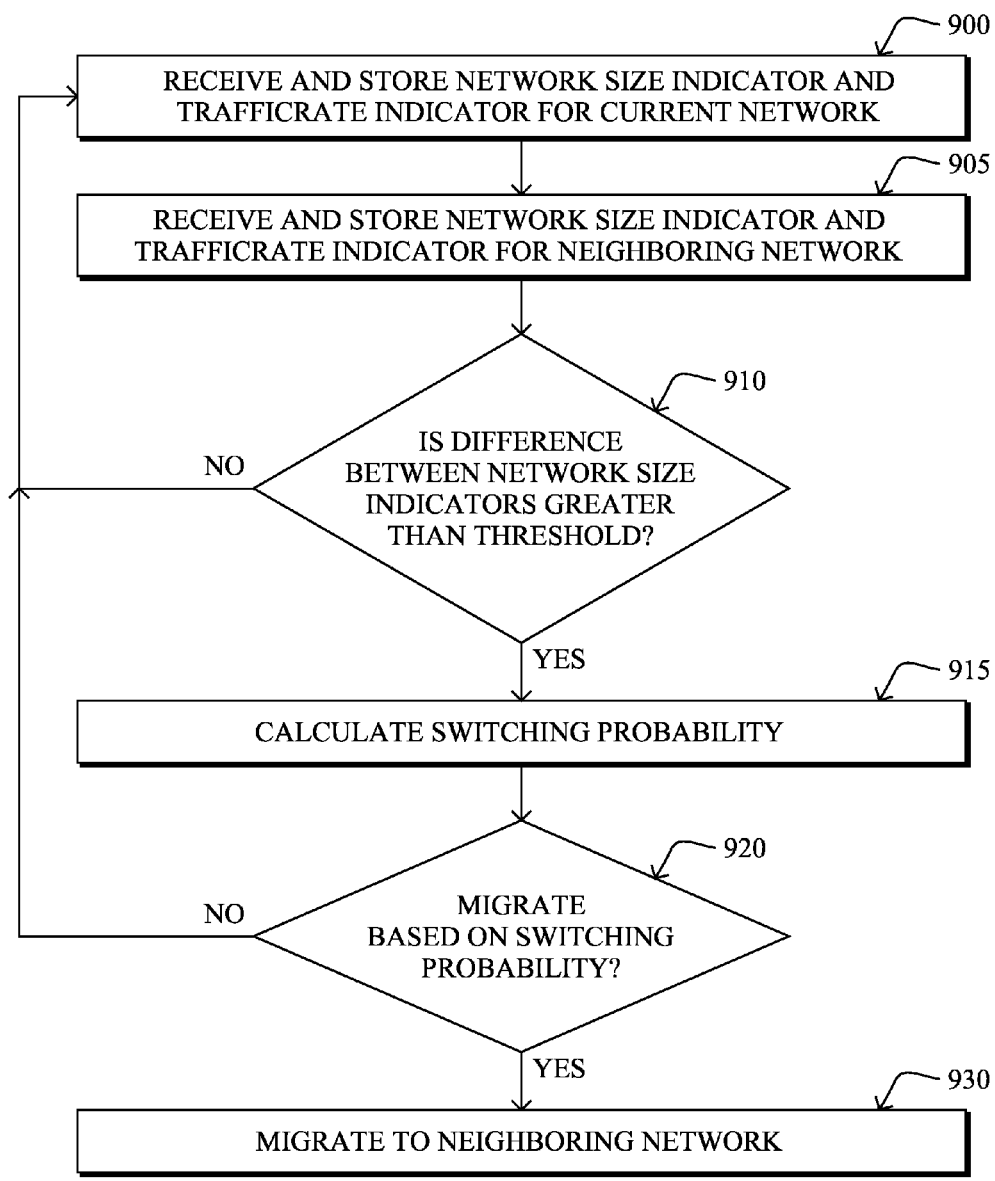
FIG. 9 illustrates another example of a procedure for determining routing domain migration using a traffic rate indicator.

FIG. 9 illustrates another example procedure for routing domain migration using the techniques described herein, which includes scaling the probability factor calculation based on each device's contribution to the overall traffic flow.

In this example, a traffic rate (or "TrafficRate" herein) indicator is added to the routing beacons. The TrafficRate indicator value may be determined by computing a moving window average of the traffic flowing through the LLN interface. The switch hold time in Step 925 below should account for the moving window average. In general, having a large window increases the time constant and overall stability of the networks. When using RPL, the TrafficRate indicator may be encoded in a DAG Metric Container (defined in draft-ietf-roll-routing-metrics). Each device also maintains a moving window average of the traffic that it generates, called TrafficRate_local.

At Step 900, device 200 (e.g., device 23) receives a NetSize indicator and a TrafficRate indicator for the network it is currently part of (e.g., routing domain 110) through its network interface 210 and stores the first NetSize indicator and first TrafficRate indicator in memory 240. The newly defined NetSize indicator and TrafficRate indicator are included in routing beacons from the ingress router 115. When using RPL, the NetSize indicator and TrafficRate indicator may be determined by the DAO messages sent by each node in the network, and the NetSize indicator and TrafficRate indicator may be encoded in a DAG Metric Container, which is used in the DIO (defined in draft-ietf-roll-routing-metrics). The LBR (e.g., ingress router 115) sets the NetSize indicator value and TrafficRate indicator and all other devices simply propagate the value throughout the network.

At Step 905, device 200 receives a NetSize indicator and a TrafficRate indicator for a neighboring network (e.g. routing domain 120) through its network interface 210 and stores the second NetSize indicator and TrafficRate indicator in memory 240.

At Step 910, when a NetSize indicator value and TrafficRate indicator are received from a neighboring network, device 200 compares the new NetSize indicator to the NetSize indicator value of its current network, as described in Step 610 above. If the difference between the NetSize indicators is less than the network size difference threshold, the process returns to Step 900 and device 200 does not migrate to the neighboring network. If the difference between the NetSize indicators is greater than the network size difference threshold, the process continues with Step 915.

At Step 915, a switching probability is calculated to determine if device 200 should migrate to the neighboring network. In this example, the switching probability may be calculated as:

$$\left(\frac{\text{TrafficRate\_local} * \text{first network size}}{\text{first traffic indicator}}\right) *$$
$$\text{weighting factor} *$$
$$\frac{(\text{first network size} - \text{second network size})}{\text{first network size}},$$

where the weighting factor is used to control the number of devices that should consider switching between networks, as described in Step 615 above. Illustratively, TrafficRate/NetSize is the fraction that each device should receive assuming complete fairness. Dividing TrafficRate_local by (TrafficRate/NetSize) represents the percentage from the fair value. For example, if TrafficRate_local is twice (TrafficRate/NetSize), then the node's probability of switching will double. At this point, rather than calculating the switching probability immediately, device 200 may also wait for a switch hold time and reevaluate the network size after the switch hold time as described in Steps 615 and 605'-610' above before calculating the switching probability.

At Step 920, device 200 determines whether or not to migrate from the current network to the neighboring network based on the calculated switching probability, as discussed in Step 625 above. If device 200 determines that it should migrate to the neighboring network based on the random trial and the switching probability, at Step 930 device 200 migrates to the neighboring network. Otherwise, the process returns to Step 900.

Note that in the presence of link-layer security, it may not be possible for devices to decode routing beacons from other networks. As a result, devices may also include the NetSize, Path Cost, resource factor, and TrafficRate values in link-layer beacons (e.g., IEEE 802.15.4e Enhanced Beacons using a newly defined Information Element). The routing protocol propagates the values from the LBR to all devices. Devices can use the values in routing beacons to switch between different DODAGs in the same RPL Instances, since they are all a part of the same PAN. However, when deciding to switch PANs, devices can use the values included in IEEE 802.15.4 Enhanced Beacons.

The techniques described herein, therefore, provide for efficient distributed node migration in a communication network. In particular, the techniques herein allow devices to autonomously change networks in attempt to balance the load across different LLN interfaces (in the same FAR or across different FARs), which often represents the resource bottleneck in large-scale LLNs. Furthermore, the load-balancing minimizes the worst-case effect of LBR failures. Using a weighted process prevents the "herding" problem experienced by conventional techniques. The weight is set based on the proportional difference of the NetSize, weighting factor, and TrafficRate parameters. The NetSize indicator allows devices to balance communication, computation, and memory load on the LBRs. The weighting factor allows LBRs to express their resource capabilities. The TrafficRate indicator allows devices to consider their own traffic rate. By using a completely distributed process, the LBRs do not need to maintain any per-node state.

Conventional techniques address the balancing of the number of nodes (e.g., cell size) between different networks. For instance, an LBR (e.g., cell relay) in one conventional technique includes the number of devices in its network in routing messages, which propagate to all devices in the network. When a node receives a routing message from a different network, it compares the different cell sizes and attempts to switch networks if the other network's cell size is smaller by some threshold. However, that this type of system is susceptible to the "herding" effect, where all devices receiving such beacons may decide to switch at the same time. Furthermore, conventional techniques only consider number of nodes and are not capable of expressing the resources available across different LBRs or the traffic generated by individual nodes.

While there have been shown and described herein illustrative embodiments that manage routing domain migration, e.g., in constrained computer networks, it is to be understood that various other adaptations and modifications may be made within the spirit and scope of the embodiments herein. For example, the embodiments have been shown and described herein with relation to LLNs, and more particularly, to the RPL protocol. However, the embodiments in their broader sense are not as limited, and may, in fact, be used with other types of networks and/or protocols, particularly those that may be constrained or would otherwise benefit from the techniques herein. Also, while the example routing domains 110/120 are generally shown as corresponding to DAGs 410/415, the migration between DAGs is merely one example of routing domain migration, and is not meant to be limiting on the embodiments herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, at a network interface of a device connected to a first network, a first network size indicator for the first network;
receiving, at the network interface, a second network size indicator for a second network;
determining, using a processor, a difference between the first network size indicator and the second network size indicator;
calculating, via the processor, a switching probability if the difference between the first network size indicator and the second network size indicator is greater than a predetermined network size difference threshold, the switching probability calculated based on at least a normalized difference between the first network size indicator and the second network size indicator and a weighting factor; and
migrating the device from the first network to the second network based on the switching probability.

2. The method of claim 1, wherein the switching probability is calculated as, $$\frac{\text{weighting factor} * (\text{first network size} - \text{second network size})}{\text{first network size}}.$$

3. The method of claim 2, wherein the weighting factor is between 0 and 1.

4. The method of claim 2, wherein the weighting factor is between 0 and 0.5.

5. The method of claim 1, further comprising the steps of:
prior to calculating the switching probability, delaying for a predetermined switch hold time;
receiving, at the network interface, a new second network size indicator for the second network;
determining, using a processor, a difference between the first network size indicator and the new second network size indicator; and
calculating the switching probability if the difference between the first network size indicator and the new second network size indicator is greater than the predetermined network size difference threshold.

6. The method of claim 1, further comprising the steps of:
receiving at the network interface a first path cost for the first network;
receiving at the network interface a second path cost for the second network;
determining, using the processor, a difference between the first path cost and the second path cost; and
calculating, via the processor, the switching probability if the difference between the first network size indicator and the second network size indicator is greater than a predetermined network size difference threshold and the difference between the first path cost and the second path cost is greater than a predetermined path cost threshold.

7. The method of claim 1, further comprising the steps of:
receiving at the network interface a first resource factor for the first network; and
receiving at the network interface a second resource factor for the second network; wherein
the switching probability is calculated as, $$\frac{\text{weighting factor} * (\text{first resource factor} * \text{first network size} - \text{second resource factor} * \text{second network size})}{\text{first resource factor} * \text{first network size}}.$$

8. The method of claim 1, further comprising the steps of:
receiving at the network interface a first traffic rate indicator for the first network; and
calculating, using the processor, a local traffic rate comprising a moving window average of traffic generated at the device; wherein
the switching probability is calculated as, $$\left(\frac{\text{local trafficrate} * \text{first network size}}{\text{first traffic indicator}}\right) * \frac{\text{weighting factor} * (\text{first network size} - \text{second network size})}{\text{first network size}}.$$

9. An apparatus, comprising:
a network interface adapted to communicate over a network;
a processor configured to communicate with the network interface; and
a memory configured to communicate with the processor, the memory having instructions stored thereon that, in response to execution by the processor, cause the processor to perform operations comprising;
receiving a first network size indicator for a first network and a second network size indicator for a second network;
determining a difference between the first network size indicator and the second network size indicator;
calculating a switching probability if the difference between the first network size indicator and the second network size indicator is greater than a predetermined network size difference threshold, the switching probability calculated based on at least a normalized difference between the first network size indicator and the second network size indicator and a weighting factor; and
migrating from the first network to the second network based on the switching probability.

10. The apparatus of claim 9, wherein the switching probability is calculated as, $$\frac{\text{weighting factor} * (\text{first network size} - \text{second network size})}{\text{first network size}}.$$

11. The apparatus of claim 10, wherein the weighting factor is between 0 and 1.

12. The apparatus of claim 10, wherein the weighting factor is between 0 and 0.5.

13. The apparatus of claim 9, wherein the network interface is a radio transceiver, a powerline communication, or a wireless link.

14. The apparatus of claim 9, wherein the network is a local area network, a wide area network, a wireless ad-hoc network, a smart object network, a field area network, or a neighborhood area network.

15. The apparatus of claim 9, further comprising the steps of:
prior to calculating the switching probability, delaying for a predetermined switch hold time;
receiving, at the network interface, a new second network size indicator for the second network;
determining, using a processor, a difference between the first network size indicator and the new second network size indicator; and
calculating the switching probability if the difference between the first network size indicator and the new second network size indicator is greater than the predetermined network size difference threshold.

16. The apparatus of claim 9, further comprising the operations of:
receiving at the network interface a first path cost for the first network and a second path cost for the second network;
determining a difference between the first path cost and the second path cost; and
calculating the switching probability if the difference between the first network size indicator and the second network size indicator is greater than a predetermined network size difference threshold and the difference between the first path cost and the second path cost is greater than a predetermined path cost threshold.

17. The apparatus of claim 9, further comprising the operation of:
receiving a first resource factor for the first network and a second resource factor for the second network; wherein the switching probability is calculated as, $$\frac{\text{weighting factor} * (\text{first resource factor} * \text{first network size} - \text{second resource factor} * \text{second network size})}{\text{first resource factor} * \text{first network size}}.$$

18. The apparatus of claim 9, further comprising the operations of:
receiving a first traffic rate indicator for the first network; and
calculating a local traffic rate comprising a moving window average of traffic generated at the apparatus; wherein
the switching probability is calculated as, $$\left(\frac{\text{local trafficrate} * \text{first network size}}{\text{first traffic indicator}}\right) * \frac{\text{weighting factor} * (\text{first network size} - \text{second network size})}{\text{first network size}}.$$

19. A tangible non-transitory computer-readable storage medium having computer-executable instructions stored thereon that, when executed by a processor, cause the processor to perform operations comprising:
receiving a first network size indicator for a first network and a second network size indicator for a second network;
determining a difference between the first network size indicator and the second network size indicator;
calculating a switching probability if the difference between the first network size indicator and the second network size indicator is greater than a predetermined network size difference threshold, the switching probability calculated based on at least a normalized difference between the first network size indicator and the second network size indicator and a weighting factor; and
migrating from the first network to the second network based on the switching probability.

20. The computer-readable storage medium of claim 19, wherein the switching probability is calculated as, $$\frac{\text{weighting factor} * (\text{first network size} - \text{second network size})}{\text{first network size}}.$$

* * * * *

UNITED STATES PATENT AND TRADEMARK OFFICE
CERTIFICATE OF CORRECTION

PATENT NO. : 8,934,366 B2  Page 1 of 1
APPLICATION NO. : 13/550146
DATED : January 13, 2015
INVENTOR(S) : Hui et al.

It is certified that error appears in the above-identified patent and that said Letters Patent is hereby corrected as shown below:

In the Specification

In column 2, line 34, please amend as follows:
 munications (PLC) such [[is]] as IEEE 61334, IEEE P1901.2,

In column 3, line 21, please replace:
 "15.4 g" with "15.4g"

In column 4, line 32, please amend as follows:
 nation, sends a route request into the network to determine [[is]]

Signed and Sealed this
Fifteenth Day of September, 2015

Michelle K. Lee
*Director of the United States Patent and Trademark Office*